(12) United States Patent
Huang

(10) Patent No.: US 6,871,531 B2
(45) Date of Patent: Mar. 29, 2005

(54) EXTERNAL MOUNT DIFFERENTIAL TIRE PRESSURE SENSOR SYSTEM

(75) Inventor: Su Shiong Huang, Bellevue, WA (US)

(73) Assignee: Silicon Valley Micro C Corporation, San Jose, CA (US)

( * ) Notice: Subject to any disclaimer, the term of this patent is extended or adjusted under 35 U.S.C. 154(b) by 32 days.

(21) Appl. No.: 10/601,029

(22) Filed: Jun. 20, 2003

(65) Prior Publication Data

US 2004/0255662 A1 Dec. 23, 2004

(51) Int. Cl.⁷ .............................................. B60C 23/02
(52) U.S. Cl. ...................................................... 73/146.3
(58) Field of Search ............................ 73/146.5, 146.2, 73/146.3, 146.4, 146, 146.8; 340/442–448

(56) References Cited

U.S. PATENT DOCUMENTS 6,046,672 A * 4/2000 Pearman ..................... 340/447

* cited by examiner

Primary Examiner—Willam Oen

(57) ABSTRACT

An external mount tire pressure sensor system which substantially reduces the effect of centrifugal force on tire pressure measurements. A sensor has a main guide body portion with two parallel leg portions each having a central bore. A slider element is slidably mounted in each leg portion, and the two slider elements are mechanically connected for translatory movement in unison. A spring urges the slider elements to a neutral position. The sensor attaches to a tire valve stem. Gas from a tire encounters one of the slider elements and urges it in opposition to the spring force. The differential interconnection between the two slider elements cancels out the effect of the centrifugal force when the wheel rotates. A stiff flexible wall section enables the axis of the sensor to be aligned with the wheel radius to optimize performance.

15 Claims, 4 Drawing Sheets

EXTERNAL MOUNT DIFFERENTIAL TIRE PRESSURE SENSOR SYSTEM

BACKGROUND OF THE INVENTION

This invention relates to automotive tire pressure sensors. More particularly, this invention relates to a method and system for monitoring internal tire pressure of vehicles using an externally mounted sensor.

Tire pressure sensor systems are known and are commonly used to monitor the internal air pressure in individual pneumatic tires of a vehicle and to provide a warning signal to the driver whenever the internal air pressure in one or more of the vehicle tires is dangerously low or high. The warning signal is typically generated by an r.f. signal generator controlled by a microprocessor connected to the tire pressure sensor whenever the internal tire pressure measured by the sensor lies outside a predetermined normal operating range. This r.f. signal is transmitted to a vehicle-mounted receiver, which uses the warning signal to alert the driver either visually (by activating a warning lamp or display) or audibly (by activating an audible alarm) or both.

Known tire pressure systems typically employ one of two basic design configurations. The first type of design configuration employs an internal arrangement in which all components comprising the signal transmitting portions of the tire pressure sensor system are positioned within the tire casing. In a typical installation of this type, the pressure sensor, r.f. generator, the microprocessor, and the D.C. battery power source are physically installed inside the pneumatic tire casing prior to inflation of the tire, usually by attaching these components to an inner surface of the wheel. Design configurations of this first type suffer from several disadvantages. Firstly, the installation of the system components within the tire casing is not simple, requires careful attention to the component location and mounting, and increases the manufacturing cost of the entire automobile. In addition, many vehicles use steel-belted tires, which interact in a detrimental manner with the r.f. signals generated internally of the tire. Further, when the battery or one of the other system components fails, replacement of the defective component requires that the affected tire be removed from the wheel before replacement can be done, which is costly and time consuming.

The second type of basic design configuration used for current tire pressure sensor systems employs components which are mounted in a housing which is threadably attached to the exposed outer end of the valve stem of the tire. The sensor system components include a spring-biassed slider element translatably mounted in a guide which is threadably attached to the tire valve stem. The slider is exposed to the internal gas pressure within the tire when the guide is attached to the valve stem. The slider typically includes one or more contact elements which can interact with circuit contact elements mounted at preselected points within the guide. As the internal gas pressure increases within the tire, the slider is translated in a first direction within the guide. If the internal gas pressure reaches a maximum threshold value, the contact elements adjacent one end engage the guide circuit contact elements, which activates an r.f. generator and causes a high pressure warning signal to be generated. As the internal gas pressure decreases, the slider is translated in the opposite direction. If the internal gas pressure reaches a minimum threshold value, the contact elements adjacent the other end of the slider engage the other guide circuit contact elements, which activates the r.f. generator and causes a low pressure warning signal to be generated.

While this design arrangement avoids the disadvantages noted above associated with internally mounted tire pressure monitoring systems, the accuracy of such external mount sensors is adversely affected by the centrifugal forces associated with the rotating wheel. In particular, as the angular velocity of the wheel changes, the centrifugal force acting on the slider element within the sensor also changes, causing additional force to act on the slider. Thus, the linear position of the slider within the guide is a function of both the internal tire gas pressure and the centrifugal force acting on the slider. As a result, the sensor can easily produce false warning signals, and can also fail to generate a valid warning signal. This problem is compounded by the fact that the sensor guide may not be mounted exactly radially of the wheel, but at an angle with respect to the radial direction. Consequently, it is difficult to design a sensor in such a manner as to compensate for the centrifugal force component acting on the sensor slider. Efforts to provide a simple yet accurate and durable tire pressure monitoring system using an external valve stem mounting configuration have not been successful to date.

SUMMARY OF THE INVENTION

The invention comprises a method and system for monitoring internal vehicle tire pressure employing externally-mounted components which are relatively simple and inexpensive to manufacture and install on a vehicle, which provide accurate internal tire pressure readings, which can easily and inexpensively be replaced in case of failure, and which substantially reduce or entirely eliminate inaccurate pressure readings due to the effect of centrifugal forces on the sensor components.

In a broadest aspect, the invention comprises an external mount tire pressure sensor system having a main guide body member with a pair of laterally spaced essentially parallel leg portions joined by an intermediate portion, each leg portion having a slider element bore with an essentially linear section. The intermediate portion of the main guide body member preferably has an arcuate shape. A first one of the leg portions has an open end attachable to a tire valve stem, preferably by means of an internally threaded wall portion adjacent the open end. The other one of the leg portions has a closed end.

A pair of slider elements are each translatably located in a different one of the leg portions, and the pair of slider elements is mechanically coupled together for translatory motion in unison so that a superior force acting on one of the slider elements causes both to move by the same amount. The two slider elements are preferably mechanically interlinked by a stiff, flexible member. The slider element in the first one of the leg portions has a fluid seal, preferably an O-ring seal, about the periphery.

A bias element, preferably a spring, is positioned between the closed end of the other leg portion and a free end of the slider element in the other one of the leg portions for urging the pair of slider elements to a neutral position.

A fluid entrance element is included in the first leg portion adjacent the open end for communicating internal gas pressure from a vehicle tire mounted on a wheel to a confronting surface of the slider element in the first one of the leg portions so that gas pressure from the tire can produce a translatory force on the slider element in the first leg portion in opposition to the bias element. The fluid entrance element preferably comprises an apertured partition positioned in the slider element bore in the first leg portion adjacent the open end and a plunger member extending toward the open end for engaging the plunger of a tire valve when the sensor system is installed on a tire valve.

The sensor system further includes electrical position contacts mounted in the slider element bore for enabling determination of the translatory position of at least one of the slider elements.

The sensor system is installed on the valve stem of a tire by engaging the internal threads of the main guide body member with the external threads of the tire valve stem and rotating the main guide body member until the two are fully engaged. When fully engaged, the sensor plunger retracts the tire valve stem plunger to admit gas from the tire to the interior of the sensor where it applies a force to the slider element located in the first leg. If this force is greater than the spring force, both slider elements are displaced in their respective bores, and the electrical position contacts register this displacement. Any influence of centrifugal force due to rotation of the wheel is cancelled out by the differential interconnection of the two slider elements.

The main guide body member is provided with a stiff flexible adjustment wall section for enabling the spatial attitude of the main guide body member to be manually adjusted after the sensor system is initially attached to a tire valve stem. The adjustment wall section is preferably located adjacent the open end inboard of the fluid entrance element. The adjustable wall section enables the installer to manipulate the main guide body portion to align the longitudinal axis of the sensor with the radius of the wheel. This optimizes the sensor position with respect to the wheel radius so that any centrifugal force will act equally on each slider element.

The invention provides a convenient solution to the problem of monitoring internal tire pressure in vehicles equipped with pneumatic tires when using an externally mounted pressure sensor attached to the tire valve stem. The system can be installed either during assembly of a new vehicle or as an aftermarket item. Further, existing vehicles without tire pressure sensor systems can easily be retrofitted with a state-of-the-art system at relatively low cost. This is particularly beneficial in jurisdictions which mandate low tire pressure warning devices on all road vehicles. Most importantly, the invention affords a low cost, effective solution to the problem of unwanted centrifugal force contributions to the positioning of the slider element in external mount tire pressure systems.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
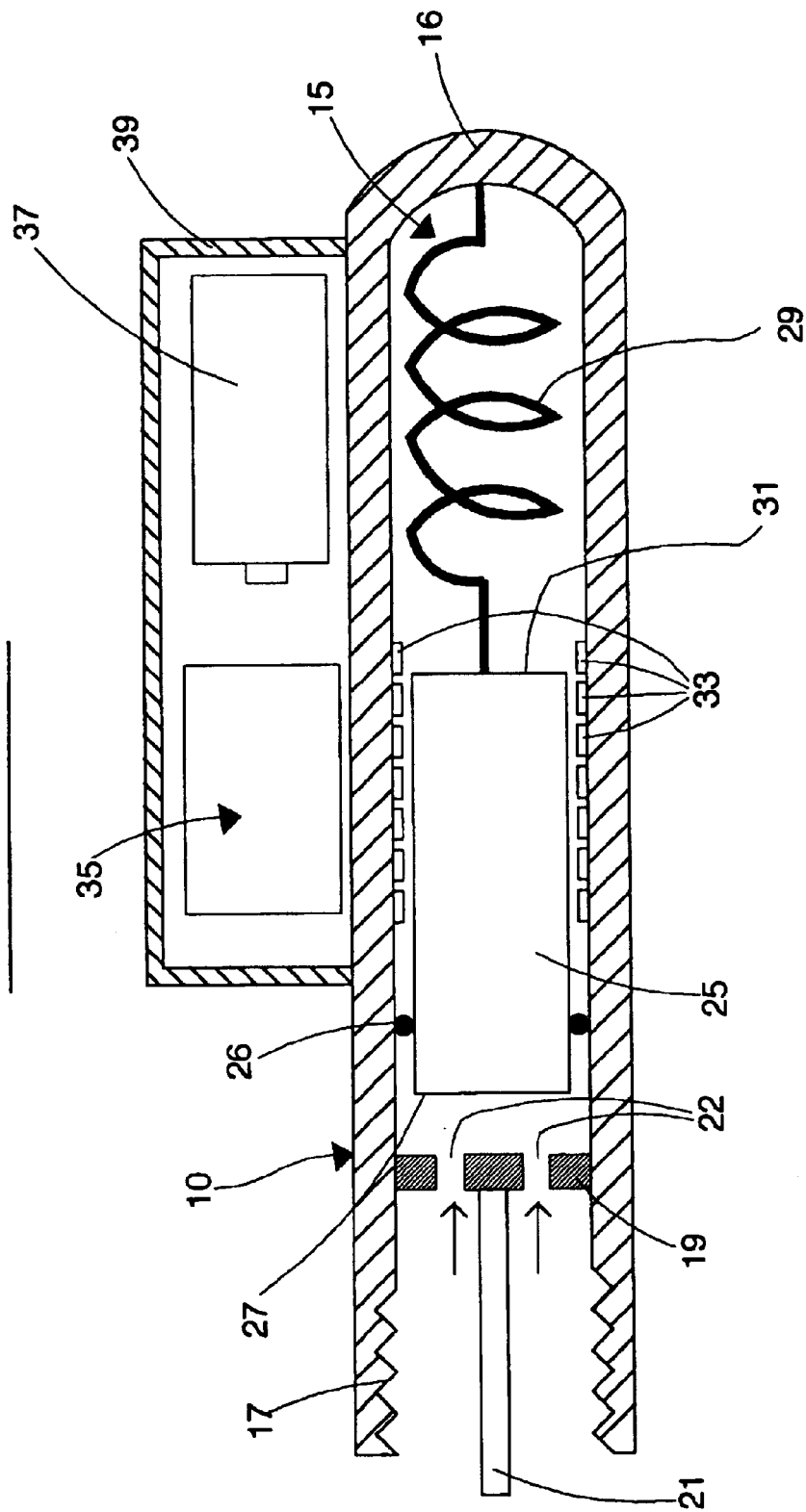
FIG. 1 is a schematic sectional view of a valve stem mount external single tire pressure sensor according to the prior art.

Turning now to the drawings, FIG. 1 is a schematic sectional view of a typical prior art external valve stem mounted tire pressure sensor. As seen in this Fig., the known tire pressure sensor system includes an electromechanical sensor generally designated with reference numeral 10 having a main guide body member 12 fabricated from a durable metal, such as steel, aluminum, or the like. Guide body member 12 has a longitudinally extending central bore 15 which is closed at one end by an integral end wall portion 16. The other end of guide body member 12 is open and the internal wall portion of this open end is provided with internal threads 17 of size and pitch to sealingly engage the external threads of a conventional tire valve stem (not shown). A bore partition 19 is arranged within bore 15 adjacent the open end, and includes a centrally positioned outwardly extending plunger 21 which engages the tire valve stem plunger when the sensor is threadedly attached to the tire valve stem so that gas pressure within the tire is communicated into the internal bore 15 via partition apertures 22.

A slider element 25 is located within bore 15 in the hollow region between bore partition 19 and end wall portion 16. A fluid seal 26, usually an O-ring, is positioned between the external surface of slider element 25 and the internal wall surface of bore 15 so that gas pressure from the tire acts essentially on the end wall surface 27 of slider element 25. A bias spring 29 is coupled between end 31 of slider element 25 and end wall portion 16 to provide a centering counter force on slider element 25 which urges slider element 25 to a neutral position in bore 15.

A plurality of position sensor contacts 33 is arranged along the inner wall surface of bore 15. Contacts 33 serve to identify the linear position of slider element 25 within bore 15 and are electrically connected to a transmitter in a transmitter and antenna module 35. A battery 37 provides electrical power necessary for the operation of the sensor system. Module 35 and battery 37 are housed in a cover member 39 attached to the main guide body member 12.

In operation, sensor system 10 is attached to a tire valve stem by engaging the internal threads 17 with the external tire valve stem threads and rotating the main guide body member 12. As plunger 21 advances into the tire valve stem, the free end of plunger 21 engages the free end of the tire valve stem plunger, thus releasing internal tire gas pressure into bore 15. The pressure of the gas acts on end wall 27 of slider element 25, which is translated within bore 15 by an amount determined by the force on end wall 27 due to the gas pressure and the opposing spring force produced by spring 29 in the opposite direction. As slider element 25 is translated along bore 15, position sensor contacts 33 convey position information to the transmitter in module 35. As the internal tire gas pressure varies, slider element 25 is re-positioned accordingly. If the gas pressure rises to a maximum threshold value, the transmitter generates a high pressure warning signal, which is broadcast by the antenna to the associated receiver, and a high pressure warning indicator is activated in the driver's compartment. If the gas pressure falls to a minimum threshold value, the transmitter generates a low pressure warning signal, which is broadcast by the antenna to the associated receiver, and a low pressure warning indicator is activated in the driver's compartment.

While the above-described prior art tire pressure sensor system is capable of providing accurate warning signals to the driver while the vehicle is stationary, once the vehicle is in motion the accuracy is severely impaired by the action of centrifugal force on the slider element 25. This force, generated by the wheel rotation, directly influences the position of slider element 25 within the bore 15. The magnitude of the centrifugal force actually acting on the slider element 25 is a function of the angular velocity of the wheel and the solid angle subtended by the longitudinal axis of main guide body member 12 and the wheel radius. Since the position of main guide body member 12 depends on the angle at which the tire vale stem emerges from the rim of the wheel, which varies from tire-to-tire and wheel-to-wheel, it is impossible to calculate with any accuracy the solid angle subtended by the sensor body axis and the wheel radius in advance of installation. In addition, the actual position of the sensor during wheel rotation may change with the angular velocity of the wheel and the centrifugal force acting on the sensor body and valve stem. Thus, until the advent of the invention described below, it has been at least extremely complicated and practically impossible to devise a compensation structure to eliminate the effect of centrifugal force on the accuracy of known external valve stem mounted tire pressure sensor systems.

Figure 2:
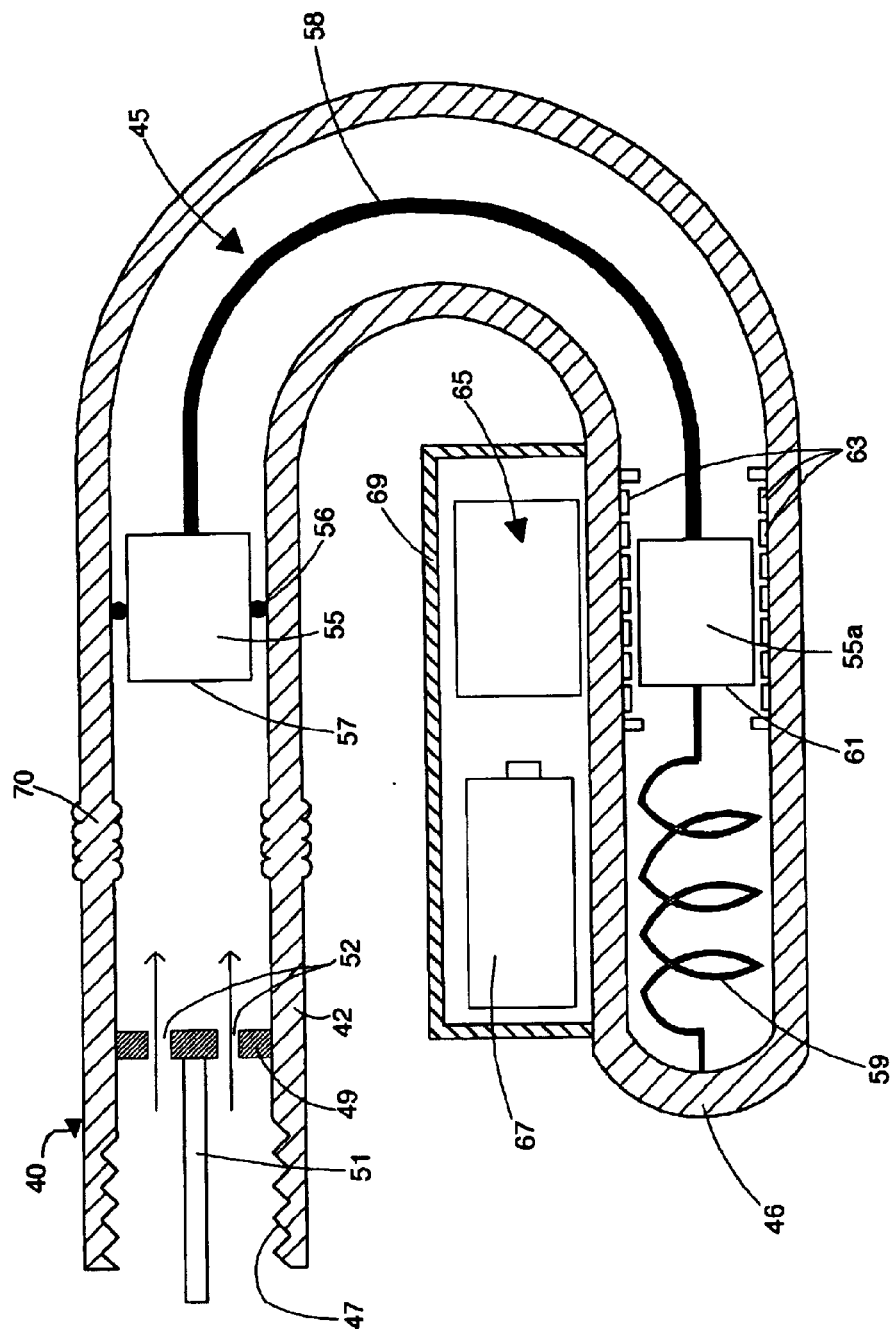
FIG. 2 is a schematic sectional view of a differential tire pressure sensor according to the invention.

FIG. 2 is a schematic sectional view illustrating the preferred embodiment of the invention which substantially reduces or entirely eliminates the influence of centrifugal force on the accuracy of an external valve stem mounted tire pressure sensor system. As seen in this Fig., the invention 40 has a main guide body member 42 with two linear leg portions joined by a curved intermediate portion. Like the prior art sensor described above, the open end of main guide body member 42 has internal threads 47 for attaching the device to a tire valve stem, and a central partition 49 with a plunger 51 for engaging the tire valve stem plunger when the device is installed on the tire valve stem. Partition 49 has fluid communication apertures 52 to enable the internal tire gas pressure to be admitted to the entry portion of an internal bore 45.

Positioned within one leg portion of bore 45 (the leg portion adjacent partition 49) is a first slider element 55 arranged for linear translation along the straight portion of that part of the bore 45. A fluid seal, such as the O-ring 56 illustrated, ensures that the gas pressure admitted through apertures 52 acts essentially one end wall surface 57 of slider element 55. A second slider element 55a is positioned within the other leg portion of bore 45 (the leg portion adjacent the closed end wall 46) and is also arranged for linear translation along the straight portion of that part of the bore 45. A spring 59 is interposed between end wall surface 61 of slider element 55a and the inner wall surface of end wall 46 and applies a biasing force to slider element 55a. Slider elements 55 and 55a are rigidly interconnected together by means of a flexible connector member 58 which interlinks translatory motion of each slider element so that both slider elements move in tandem, regardless of which of the two slider elements currently experiences the superior force. Thus, if the force due to the gas pressure on wall surface 57 of slider element 55 is greater than the spring force exerted on slider element 55a, both slider elements will be translated an equal amount in the direction inward of the main guide body member 42. Conversely, if the spring force is greater than the force due to the gas pressure, both slider elements will be translated an equal amount in the opposite direction. Flexible connector member 58 may be fabricated from any suitable material capable of providing the necessary rigidity to prevent compression or expansion of the member 58, while having sufficient flexibility to follow the arcuate path presented by the curved intermediate portion of main guide body member 42. Some metal materials, such as stainless steel rod; as well as some synthetic materials such as Kevlar and polycarbonate in rod form, may be used. Other materials will occur to those skilled in the art.

Slider element 55a coacts with position sensor contacts 63 in the same manner as that described above for the prior art device of FIG. 1. In turn, position sensor contacts 63 convey slider element position information to a transmitter in a transmitter and antenna module 65, which broadcasts appropriate warning signals via the antenna in module 65 to an associated receiver. A battery 67 provides appropriate electrical power to the circuits. Module 65 and battery 67 are both housed in a cover 69 attached to main guide body member 42.

In use, the invention of FIG. 2 is initially installed by engaging the internal threads 47 with the external threads of the tire valve stem and rotating the main guide body member 42 about the tire valve stem until the two members are fully engaged. As plunger 51 advances into the tire valve stem, the free end of plunger 51 causes the tire valve stem plunger to retract, thus admitting the internal gas into bore 45, through apertures 52 and onto surface 57 of slider element 55. As the gas pressure varies, this variation causes translation of both slider elements 55, 55a in unison. When the vehicle starts to move, and centrifugal force is created by the angular velocity of the wheel, the centrifugal force acting on slider element 55 also acts on slider element 55a. Since this force at any given instant is unidirectional, it acts equally on slider elements 55, 55a, but with opposite effect. For example, if the centrifugal force is from the right as viewed in FIG. 2, this force acts on slider element 55 to urge this element to the left and also acts on slider element 55a to urge this element to the left. Since both slider elements are rigidly linked together by connector 58, neither will move in response to the centrifugal force. This differential interconnection thus cancels out the effect of centrifugal force on the linear position of the slider elements. Thus, regardless of the magnitude, direction, and manner of variation of the centrifugal force produced by the rotation of the wheel, the differential interconnection of the two slider elements eliminates any influence of this force on the accuracy of the pressure measurements obtained.

As noted above in connection with the description of the prior art device of FIG. 1, one of the factors affecting the magnitude of the centrifugal force which influences a tire pressure sensor slider element is the solid angle subtended by the axis of the main guide body member and the radius of the wheel. In order to minimize the uncertainty attendant upon the exact magnitude of this angle, the invention is provided with a feature which allows the longitudinal axis of each parallel leg portion of the main guide body member 42 to be manually adjusted during installation of the sensor 40 on the tire valve stem so that these axes are essentially parallel to the radius of the wheel. As seen in FIG. 2, the portion of the main guide body member adjacent the partition 49 has a stiffly flexible wall section 70. This wall section 70 is constructed in a manner similar to the flexible wall section of a conventional oil or hydraulic fluid funnel so that the spatial attitude of the main guide body member 42 to the right of the flexible wall section 70 can be selectively manipulated with respect to that portion of the main guide body portion to the left of wall section 70, all as viewed in FIG. 2. Given the stiffness of wall section 70, however, after manual adjustment, the relative position of main guide body member 42 will remain fixed over a wide range of centrifugal forces up to a magnitude which will only be achieved under the most extreme circumstances. The manner in which this is accomplished will now be described with reference to FIGS. 3 and 4.

Figure 3:
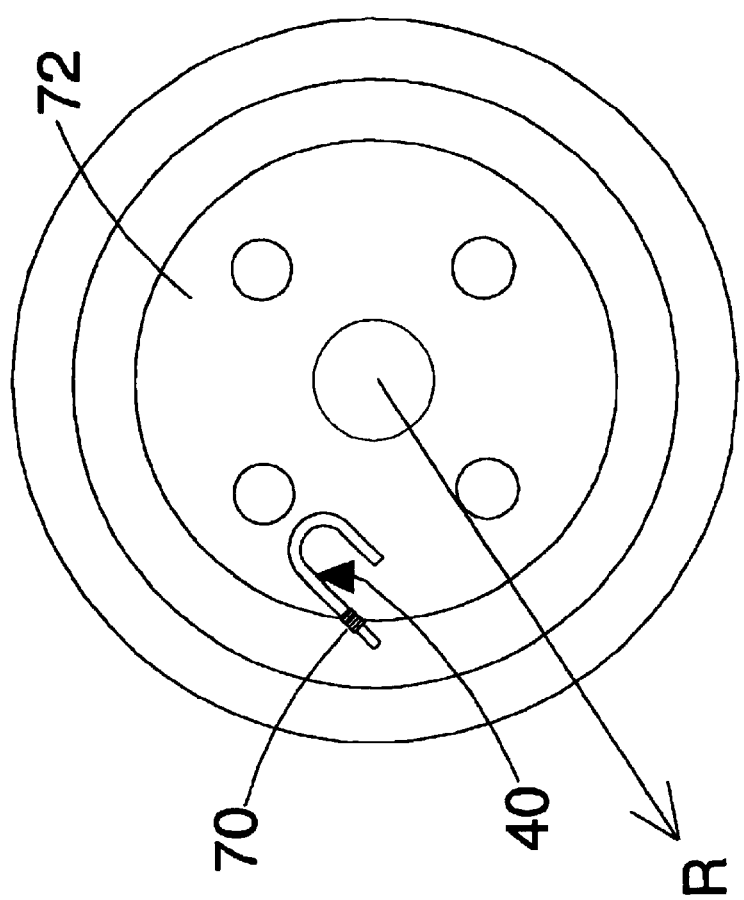
FIG. 3 is a schematic view illustrating initial installation of the sensor according to the invention on a tire valve.

FIG. 3 illustrates in schematic form the spatial attitude of the sensor 40 after initial installation on the valve stem of a tire on a wheel 72. As seen in this Fig., the sensor 40 has achieved a random spatial attitude with respect to the radius R of wheel 72, due to the random nature of the angle of emergence of the tire valve stem from the wheel 72. If left in this random attitude, it is highly likely that the pressure measurements obtained even by the differential configuration of the sliders according to the invention will be less than completely accurate due to the unequal centrifugal forces acting on slider elements 55 and 55*a*. The magnitude of this inequality is a factor of the slightly different solid angles subtended by the two leg portion axes with respect to the radius R of the wheel.

Figure 4:
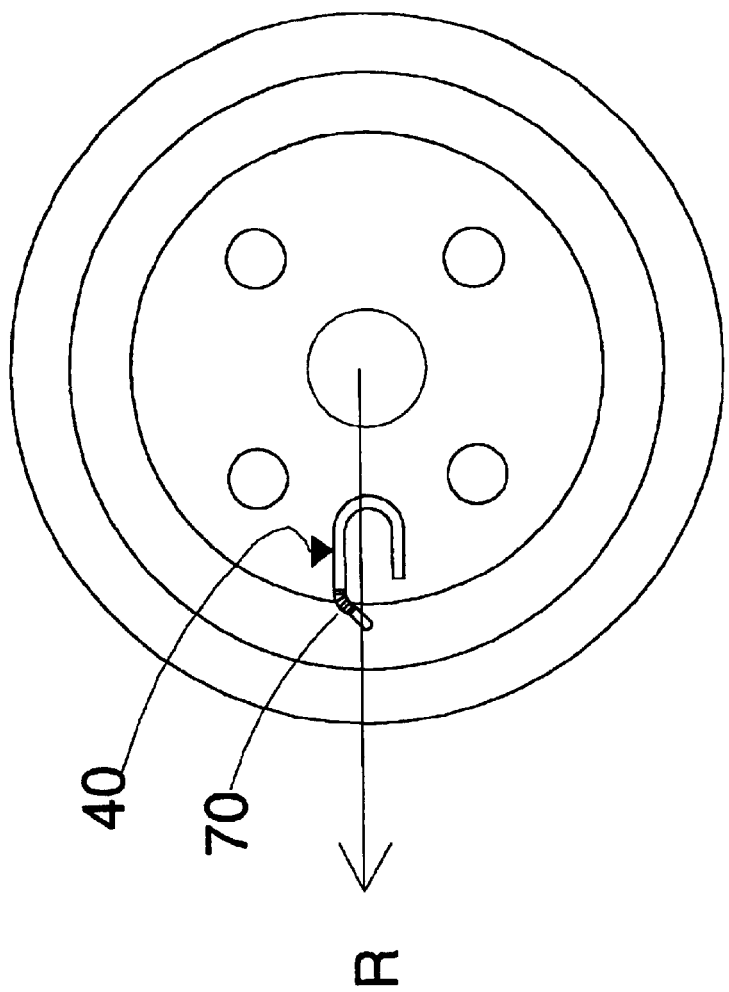
FIG. 4 is a schematic view illustrating the installation of the sensor according to the invention after proper final adjustment.

FIG. 4 illustrates in schematic form the spatial attitude of the sensor 40 after manual adjustment by the installer. As seen in this Fig., the sensor 40 has both main guide body member leg portion axes essentially aligned with the radius R of the wheel 72. Consequently, the centrifugal force acting on the slider elements 55 and 55*a* positioned in each leg portion will be essentially the same, thereby eliminating the effect of the centrifugal force on the tire pressure measurement.

While the preferred embodiment has been thus-far described as a single unit for one tire, in practice each tire of a vehicle will be equipped with a tire pressure sensor system 40. Various encoding arrangements can be made to uniquely identify each individual sensor, and the warning indicator can be configured to identify the particular tire which is currently under-inflated or over-inflated.

As will now be apparent, the invention provides a simple, low cost internal tire pressure sensor system which substantially reduces or entirely eliminates the effect of centrifugal force on the tire pressure reading. In addition, the sensor system according to the invention is relatively simple to install on a vehicle tire without requiring the removal of the tire from the wheel. Moreover, the tire pressure sensor according to the invention can be installed on the vehicle wheel during mounting of the tire on the wheel. Further, replacement of the battery or other failed system components can be done without the need for removing the tire from the wheel, which simplifies repair or replacement of the entire system and thus lowers the cost of maintenance. Lastly, the invention provides an accurate and reliable system for monitoring tire safety on all vehicles using pneumatic tires.

While the invention has been described with reference to a particular preferred embodiment, various modifications, alternate constructions, and equivalents may be employed, as desired. For example, different flexible wall section constructions may be used for wall section 70 than that described with reference to the preferred embodiment. Also, other position sensor contact arrangements may be used, such as a limit stop contact pair on each end of the permitted linear travel range of one or both slider elements 55, 55*a*. Further, position sensor contact elements 63 may be arranged in the bore region of slider element 55, or in the bore regions of both slider elements 55, 55*a*. Therefore, the above should not be construed as limiting the invention, which is defined by the appended claims.

What is claimed is:

1. An external mount tire pressure sensor system comprising:

a main guide body member having a pair of laterally spaced essentially parallel leg portions joined by an intermediate portion, each leg portion having a slider element bore with an essentially linear section, a first one of said leg portions having an open end attachable to a tire valve stem, the other one of said leg portions having a closed end;

a pair of slider elements each translatably located in a different one of said leg portions, said pair of slider elements being mechanically coupled together for translatory motion in unison; the slider element in said first one of said leg portions being in fluid sealing relation with the associated slider element bore;

a bias element positioned between said closed end and a free end of the slider element in said other one of said leg portions for urging said pair of slider elements to a neutral position; and a fluid entrance element for communicating internal gas pressure from a vehicle tire mounted on a wheel to a confronting surface of the slider element in said first one of said leg portions so that gas pressure from said tire can produce a translatory force on said slider element in said first leg portion in opposition to the bias element.

2. The invention of claim 1 wherein said intermediate portion of said main guide body member has an arcuate shape.

3. The invention of claim 1 wherein said pair of slider elements is mechanically interlinked by a stiff, flexible member.

4. The invention of claim 1 wherein said fluid sealing relation between said slider element in said first on of said leg portions and the associated slider element bore is provided by an O-ring seal mounted on said slider element in said first on of said leg portions.

5. The invention of claim 1 wherein said bias element comprises a compression spring.

6. The invention of claim 1 wherein said fluid entrance element comprises an apertured partition positioned in said slider element bore in said first leg portion adjacent said open end and a plunger member extending toward said open end for engaging the plunger of a tire valve when said sensor system is installed on a tire valve.

7. The invention of claim 6 wherein said first leg portion includes an internally threaded wall portion for attaching said sensor system to a tire valve.

8. The invention of claim 1 wherein said sensor system further includes electrical position contacts mounted in said slider element bore for enabling determination of the translatory position of at least one of said slider elements.

9. The invention of claim 1 wherein said main guide body member is provided with a stiff flexible adjustment wall section for enabling the spatial attitude of said main guide body member to be manually adjusted after said sensor system is attached to a tire valve stem.

10. The invention of claim 9 wherein said adjustment wall section is located adjacent said open end.

11. The invention of claim 10 wherein said adjustment wall section is located inboard of said fluid entrance element.

12. A method for monitoring the internal tire pressure of a vehicle tire mounted on a wheel having a radius, said method comprising the steps of:

(a) providing a tire pressure sensor having a main guide body member with a sensor axis, a stiff flexible adjustment wall section and a mechanism for enabling attachment of the sensor to a tire valve stem;

(b) installing the sensor on a tire valve stem; and (c) manually adjusting the spatial attitude of the sensor relative to the wheel so that the sensor axis is closely aligned with the radius of the wheel.

13. The method of claim 12 wherein said step (c) of manually adjusting includes the step of bending the stiff flexible wall section by grasping the main guide body member and manipulating the main guide body member about the stiff flexible wall section.

14. A method for substantially reducing the effect of centrifugal force on an externally mounted tire pressure sensor adapted for mounting on a tire valve stem, said method comprising the steps of:
(a) providing a differential tire pressure sensor having a pair of mechanically connected slider elements each translatably mounted in a bore in a different leg portion of a main guide body member having a pair of leg portions with essentially parallel axes so that said pair of slider elements move in unison;
(b) installing the sensor on a tire valve stem; and
(c) manually adjusting the spatial attitude of the sensor relative to the wheel so that the axes are closely aligned with the radius of the wheel.

15. The method of claim 14 wherein said step (c) of manually adjusting includes the step of bending the stiff flexible wall section by grasping the main guide body member and manipulating the main guide body member about the stiff flexible wall section.

* * * * *